US008923776B1

(12) United States Patent
Nelson

(10) Patent No.: US 8,923,776 B1
(45) Date of Patent: Dec. 30, 2014

(54) SHORT LOOP CONNECTION METHOD

(75) Inventor: Eric G. Nelson, Wayne, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 198 days.

(21) Appl. No.: 13/471,530

(22) Filed: May 15, 2012

Related U.S. Application Data

(60) Provisional application No. 61/486,794, filed on May 17, 2011.

(51) Int. Cl.
*H04B 1/38* (2006.01)

(52) U.S. Cl.
USPC ............... 455/73; 455/559; 455/77; 361/707; 361/735; 361/679.31; 361/802; 439/261; 439/639; 439/650

(58) Field of Classification Search
USPC ............... 455/73, 559; 361/707, 735, 679.31, 361/802, 818; 439/261, 639, 638, 650, 439/620.22
See application file for complete search history.

(56) References Cited

U.S. PATENT DOCUMENTS 4,619,496 A * 10/1986 Forney et al. ................ 439/434
4,827,378 A * 5/1989 Gillan et al. ................ 361/818
5,641,953 A * 6/1997 Fisher, Jr. ................ 200/50.12
5,761,052 A * 6/1998 Wheeler-King et al. ...... 361/803
5,886,671 A * 3/1999 Riemer et al. ................ 343/776
6,066,815 A * 5/2000 Spedale ................ 200/51.03
6,122,704 A * 9/2000 Hass et al. ................ 711/100
6,146,153 A * 11/2000 Koradia et al. .............. 439/76.1
6,319,066 B2 * 11/2001 Kuo ................ 439/638
6,385,055 B1 * 5/2002 Kramer et al. ................ 361/816
6,426,464 B1 * 7/2002 Spellman et al. .......... 174/101.5
6,473,039 B1 * 10/2002 Whybrew et al. ...... 343/700 MS
6,482,042 B1 * 11/2002 Tupper ................ 439/638
6,646,518 B2 * 11/2003 Tajima ................ 333/26
6,775,905 B2 * 8/2004 Tupper ................ 29/842
6,945,821 B2 * 9/2005 Stoner et al. ................ 439/638
6,975,178 B1 * 12/2005 Kessler et al. ................ 333/105
7,402,897 B2 * 7/2008 Leedy ................ 257/678
7,495,527 B2 * 2/2009 Ornt et al. ................ 333/105
7,711,343 B2 * 5/2010 Soh et al. ................ 455/301
8,325,486 B2 * 12/2012 Arshad et al. ................ 361/737
8,360,805 B2 * 1/2013 Schwarz ................ 439/578
8,738,103 B2 * 5/2014 Puente Baliarda et al. ................ 455/575.7

* cited by examiner

*Primary Examiner* — Marceau Milord
(74) *Attorney, Agent, or Firm* — Sand & Sebolt; Daniel J. Long

(57) ABSTRACT

A system and method for connecting an external RF connector on an electrical module housing to a PCB within an electronic module is presented. The electronic module is configured to operate within a Department of Defense Joint Tactical Radio System in altitudes up to 15000 feet, at operating temperatures between −40 to +55 degrees Celsius, in driving rain and dust storms, in a corrosive salt-sea atmosphere and to withstand indirect shock. The electronic module comprises a module housing, a housing connector on an external wall of the housing, a PCB within the housing, a PCB connector for a coaxial cable mounted on the PCB and a coaxial cable with first and second ends that is looped 360 degrees between the housing connector and the PCB connector. The first end of the cable is connected to the housing connector and the second end is connected to the PCB connector.

18 Claims, 3 Drawing Sheets

SHORT LOOP CONNECTION METHOD

CROSS REFERENCE TO RELATED APPLICATION

This application claims priority from U.S. Provisional Application Ser. No. 61/486,794, filed May 17, 2011; the disclosure of which is incorporated herein by reference.

BACKGROUND OF THE INVENTION

1. Field of Invention

The current invention relates generally to apparatus, systems and methods for processing signals. More particularly, the apparatus, systems and methods relate to routing signals in coaxial cables. Specifically, the apparatus, systems and methods provide for a better way of making connections of coaxial cables to a printed circuit board for coaxial cables operating at radio frequencies.

2. Description of Related Art

There is a need in many radio systems to connect for instance Radio Frequency (RF) connector mounted on the exterior of an electronic module and a printed circuit board (PCB) inside of the electronic module. These RF signals are generally routed on a coaxial cable type of transmission line that allow these signals to be routed on a cable that has low noise and a specific impedance value. In general, a conventional coaxial cable usually consists of a centrally located inner electrical conductor surrounded by and spaced inwardly from an outer electrical conductor. A dielectric insulator is interposed between the inner and outer conductors, with the outer conductor being surrounded by a protective dielectric jacket. The outer conductor often includes a sheet of fine braided metallic strands, a metallic foil, or multiple layer combinations of either or both.

Complex projects often have very tight design requirements that require very tight tolerances for signal traveling on a coaxial cable between (RF) connector mounted on the exterior of an electronic module and a printed circuit board (PCB). For example, the Department of Defense's (DoD's) Joint Tactical Radio System (JTRS) including its ground mobile radios (GMRs) is one such example system with tight tolerances on electronic components within electronic modules used to implement many aspects that that system. The JTRS is considered a pivotal transformation program within the DoD and is a joint service initiative that addresses the growing need for integrated air, ground, and sea communications systems, which enable a network-centric capability for joint taskforces and multinational coalitions to conduct efficient and effective military operations.

For example, the tolerance of such a system are tight because each GMR is a highly flexible communication system with high processing capability that consumes significant power resulting in heat that is dissipated using large heat sinks and fans for cooling. While there are many cooling approaches, these radios must support operational and maintenance in a military tactical environment that can include altitudes up to 15000 ft, operating temperatures of −40 to +55 degrees C., storage temperatures of −55 to +71 degrees C., driving rain and dust storms, corrosive environments such as salt-sea atmospheres, and can withstand indirect shock. The system needs to be safe and promote easy of operation and maintenance in these environments by trained military personal.

All of these operation requirements and tolerances have historically required expensive components that are specially designed to meet these operational and mounting tolerances. For example, a rigid cable custom tailored to a particular shape may be used to directly connect an RF connector through the coaxial coble to a circuit board. However, this customization that required a direction connection through the coaxial cable from an external connector on an electronic module housing directly to the PCB significantly increase overall costs. Therefore, a better way is needed is to connect an RF connector on an electronic module housing to a PCB mounted in the housing.

SUMMARY OF THE INVENTION

The preferred embodiment of the invention includes an electronic module that connects an external RF connector on its housing to circuitry on a PCB within an electronic module. The electronic module is configured to operate within a Department of Defense (DoD) Joint Tactical Radio System (JTRS) in altitudes up to 15000 feet, at operating temperatures between −40 to +55 degrees Celsius, in driving rain and dust storms, in a corrosive salt-sea atmosphere and to withstand indirect shock. The electronic module includes a module housing, a housing connector on an external wall of the housing, a printed circuit board (PCB) within the housing, a PCB connector for a coaxial cable mounted on the PCB and a coaxial cable, with first and second ends, looped 360 degrees between the housing connector and the PCB connector. The first end of the cable is connected to the housing connector and the second end is connected to the PCB connector.

In some configuration of the preferred embodiment, the cable is looped in a loop that has a diameter of about one inch a circumference of about three inches and is formed as a generally circular loop. The PCB connector and/or the housing connector can be gilbert types of connectors. The coaxial cable can have a metallic inner shield and an outer braided shield. The metallic inner shield can be overlapped flat silver plated copper. The coaxial cable operate at up to 6 GHz, have a diameter of about 1.4 millimeters, have a capacitance of about 23 pf/ft and have a propagation delay of about 1.16 ns/ft.

Another configuration of the preferred embodiment is a system for receiving and transmitting radio frequency (RF) signals. The system includes an electronic radio module housing, first and second RF connectors, PCB, first and second PCB RF connectors and first and second coaxial cables. The electronic radio housing has a first side and a second side. The first RF connector is mounted on the first side of the electronic radio module and the second RF connector is mounted on the second side of the electronic radio module. The PCB is mounted inside the electronic radio module housing. The first PCB RF connector is connected the first side of the PCB and the second PCB RF connector is connected the second side of the PCB. The first coaxial cable is formed with a circular Nelson loop for receiving radio signals at the first RF connector on the first side of the electronic radio module. The received signal is sent from the first RF connector on the first side of the electronic radio module to the first PCB RF connector connected the first side of the PCB. This signal can then be processed on the PCB. The second PCB RF connector is connected the second side of the PCB. The second coaxial cable is also formed with a circular Nelson loop for transmitting radio signals at the second RF connector on the second side of the electronic radio module to the second RF connector on the second side of the electronic radio module.

Another configuration of the preferred embodiment is configured as a method of processing an RF signal with an electronic module. The method receives an RF signal at a connector on an exterior of an electronic module housing. For example, radio data such as RF signals can be received at about 2 GHz. This RF signal is next transmitted through a coaxial cable that is formed with a circular Nelson loop to a connector on a PCB mounted with in the electronic module housing. The signal is then processed on the PCB to extract readable data from the RF signal. For example, radio signs can be demodulated and useful data can be recovered and stored into a memory.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
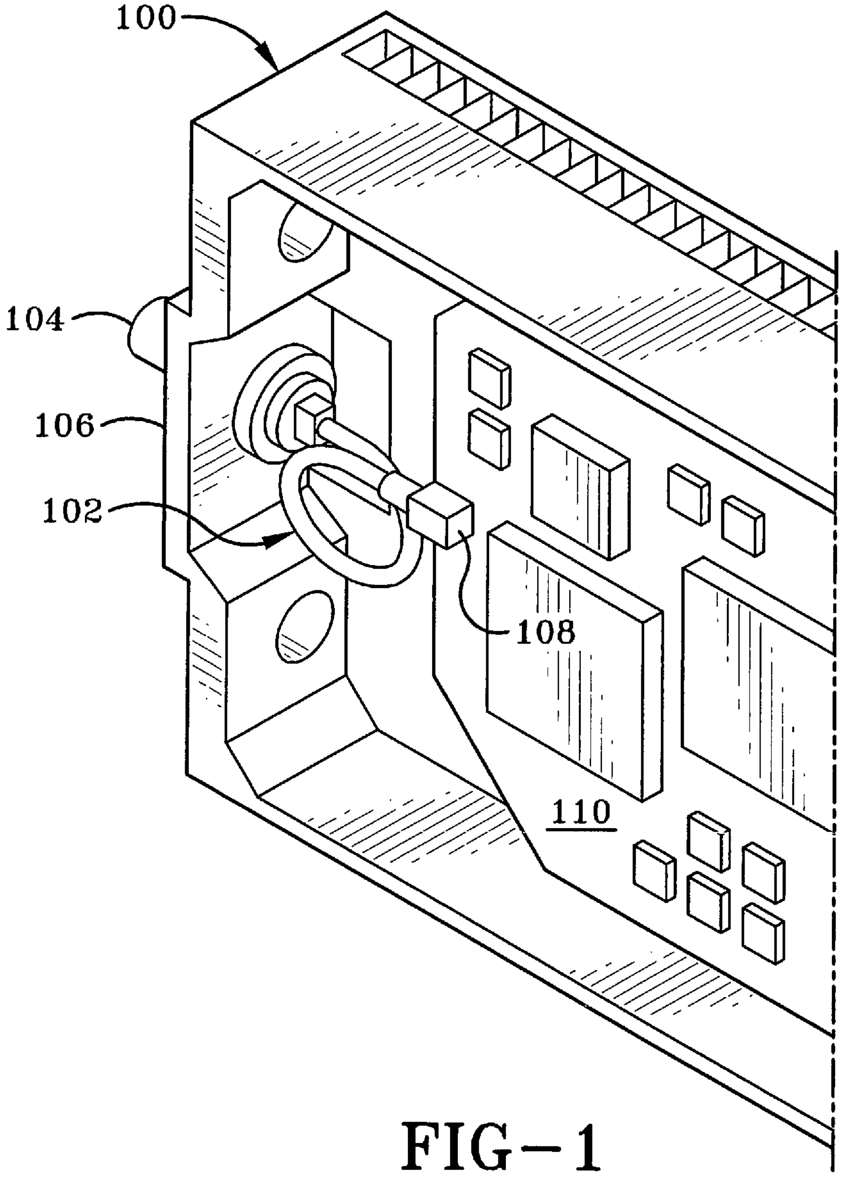
FIG. 1 is an example perspective view illustrating a preferred embodiment of a Nelson loop used to connect an RF connector on the left side of a radio module housing to a PCB mounted inside of the housing.

FIG. 1 illustrates the preferred embodiment of an electronic module 100 with a coaxial cable 102 formed with a “Nelson Loop”. The Nelson Loop is preferably a 360 degree loop that is generally circular in shape. The Nelson loop has a bending radius of about 0.2 inches, has diameter of about one inch and a circumference of about three inches. Of course the loop can be other shapes, sizes and have different bending radiuses. The coaxial cable transmits Radio Frequency (RF) signals between a housing connector 104 on an the external wall 106 and a printed circuit board (PCB) connector 108 mounted on a PCB 110 that is mounted within the electronic module 100.

Instead of using a Nelson Loop, the prior art for many years used rather expensive RF connection components that directly routed RF signals from the housing connector 104 to the PCB 110. However, using a coaxial cable with a Nelson Loop is much less expensive and has been found to still meet tight tolerances in demanding environments. For example, the electronic module 100 may need to be air tight and water tight as well as be ready to operate within a Department of Defense’s (DoD) Joint Tactical Radio System (JTRS) in altitudes up to 15000 feet, at operating temperatures between −40 to +55 degrees Celsius, storage temperatures between −55 to +71 degrees Celsius, in driving rain and dust storms, in a corrosive salt-sea atmosphere and withstand indirect shock.

The coaxial cable 102 can be any suitable cable. However, in the preferred embodiment, the cable is similar to Temp-Flex Cable, Inc.’s low loss microwave coax, 28 A WG (part no. 047-2801). This cable has a single a single central conductor with an inner shield and an outer braided shield. The single conductor is silver plated copper 0.0126"+/−0.0001" (0.032+/−0.0025 mm). The single conductor is covered with blue dual monofilaments in twisted pairs helically wrapped around the single conductor. A core tube that is 0.32"+/−0.0005" (0.81+/−0.013 mm) outside diameter is plated around the dial monofilaments. An inner shield of helically overlapped flat silver plated copper covers the core tube. The inner shield is covered with a braided shiled with an overall diameter of 0.046"+/−0.002 (1.17+/−0.05 mm). An outer jacket covers with a 0.005" (0.123 mm) wall thickness completes the coaxial cable.

In the preferred embodiment, the coaxial cable 102 is configured to operate at about 2 GHz but can operate up to 6 GHz. The coaxial cable 102 has a capacitance of about 23 pf/ft, a propagation delay of about 1.16 ns/ft, a velocity of propagation of about 87% and an impedance of 50+/−1 ohms.

Figure 2:
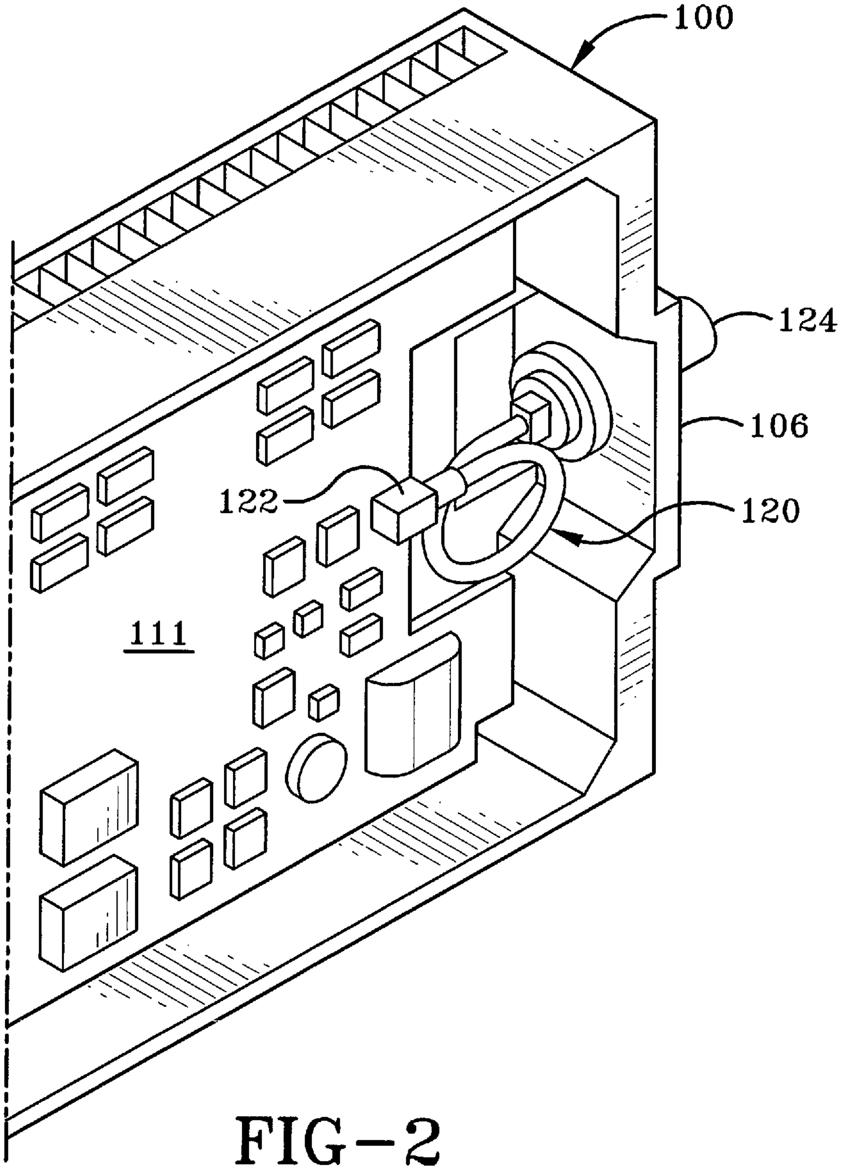
FIG. 2 is an example perspective view illustrating the preferred embodiment of a Nelson loop used to connect an RF connector on the right side of a radio module housing to a PCB mounted inside of the housing.

FIG. 2 illustrates another configuration of the preferred embodiment that includes a second coaxial cable 120 formed with another nelson loop, a second PCB connector 122 and a second RF connector 124 on the right side of the electronic module 100. In this configuration, the electronic module 100 may be a system for receiving and transmitting radio frequency (RF) signals. The first RF connector 104 for receiving radio signals is on the first (left) side of the electronic radio module and the second RF connector 124 for transmitting radio signals is on the right side of the electronic radio module. The first coaxial cable 102 is formed with a circular Nelson loop for receiving radio signals at the first RF connector 104 and sends these received radio signals to the first PCB RF connector 110 connected the first side of the PCB 110. The second coaxial cable 120 is also formed with a circular Nelson loop for transmitting radio signals at the second PCB RF connector 125 to the second RF connector connected on the second side of the electronic module.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
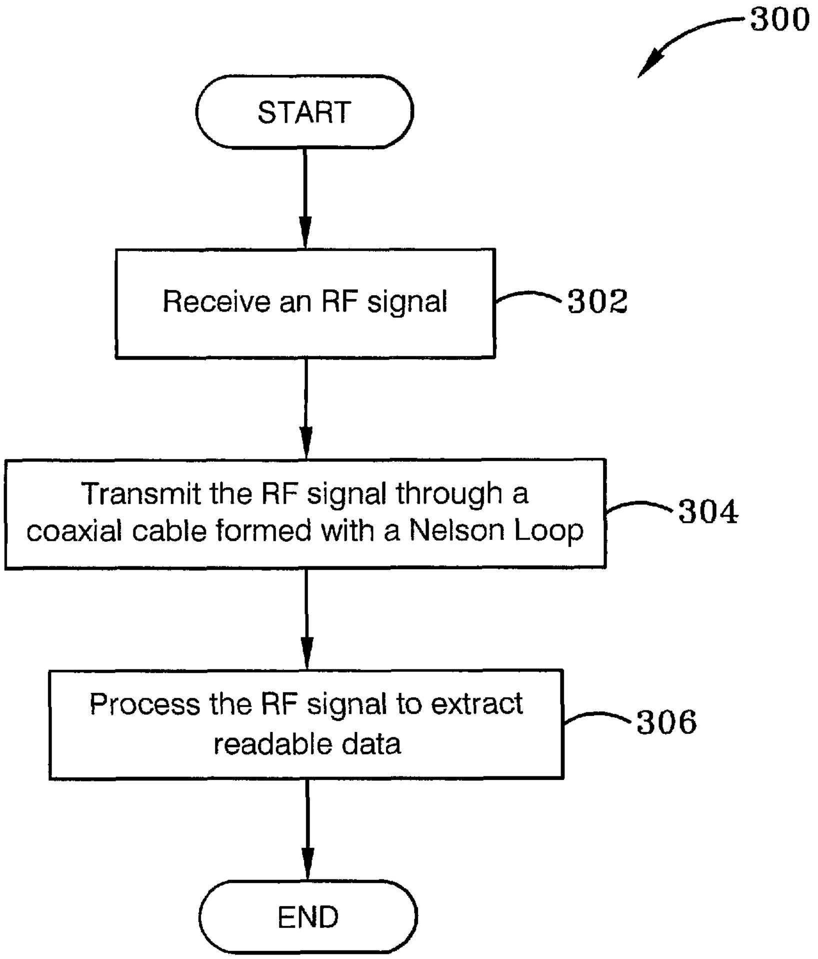
FIG. 3 illustrates an embodiment of a method for routing an RF signal from an RF connector passing through the wall of an electronic module to a PCB mounted inside the module.

FIG. 3 illustrates the preferred embodiment as a method 300 of processing an RF signal with an electronic module. The method 300 receives an RF signal at a connector on an exterior wall of an electronic module housing, at 302. For example, radio data such as RF signals can be received at about 2 GHz. This RF signal is next transmitted through a coaxial cable, at 304, formed with a circular Nelson loop to a connector on a PCB mounted with in the electronic module housing. The Nelson loop can be about the inches long and have a diameter of about one inch. The signal is then processed on the PCB to extract readable data from the RF signal, at 306. For example, radio signs can be demodulated and useful data can be recovered and stored into a memory.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. An electronic module configured to communicate a radio frequency (RE) signal comprises:

a module housing with an external wall;

a housing connector on the external wall for a coaxial cable;

a printed circuit board (PCB) mounted within the housing;

a PCB connector for a coaxial cable mounted on the PCB; and a coaxial cable looped 360 degrees between the housing connector and the PCB connector, wherein a central conductor of the coaxial cable is looped in the shape of a circle and the coaxial cable is looped in the shape of a circle with a central opening, wherein the coaxial cable has a first end and a second end with the first end connected to the housing connector and the second end connected to the PCB connector.

2. The electronic module configured to communicate the RF signal of claim 1 wherein the electronic module and the coaxial cable are configured to operate within a Department of Defense's (DOD) Joint Tactical Radio System (JTRS) in altitudes up to 15,000 feet, at operating temperatures between −40 to +55 degrees Celsius, storage temperatures between −55 to +71 degrees Celsius, in driving rain and dust storms, in a corrosive salt-sea atmosphere and withstand indirect shock.

3. The electronic module configured to communicate the RF signal of claim 1 wherein the coaxial cable is looped into a loop that has a diameter of about one inch and a circumference of about three inches.

4. The electronic module configured to communicate the RF signal of claim 1 wherein the coaxial cable has an impedance of about 50 ohms.

5. The electronic module configured to communicate the RF signal of claim 1 wherein at least one of the PCB connector and the housing connector is a gilbert type of connector.

6. The electronic module configured to communicate the RF signal of claim 1 wherein the coaxial cable is constructed similar to a Temp-Flex 047 coaxial cable.

7. The electronic module configured to communicate the RF signal of claim 1 wherein the coaxial cable further comprises:

a single central conductor.

8. The electronic module configured to communicate the RF signal of claim 7 wherein the coaxial cable further comprises:

a metallic inner shield; and an outer braided shield.

9. The electronic module configured to communicate the RF signal of claim 8 wherein the metallic inner shield is overlapped flat silver plated copper.

10. The electronic module configured to communicate the RF signal of claim 1 wherein the coaxial cable is configured to operate up to 6 GHz.

11. The electronic module configured to communicate the RF signal of claim 1 wherein the coaxial cable has a diameter of about 1.4 millimeters.

12. The electronic module configured to communicate the RF signal of claim 1 wherein the coaxial cable has a capacitance of about 23 pf/ft.

13. The electronic module configured to communicate the RF signal of claim 1 wherein the coaxial cable has a propagation delay of about 1.16 ns/ft.

14. A system for receiving and transmitting radio frequency (RF) signals comprising:

a electronic radio module housing with a first side and a second side;

a first RF connector on the first side of the electronic radio module;

a printed circuit board (PCB) mounted in the electronic radio module housing;

a first PCB RF connector connected the first side of the PCB;

a first coaxial cable formed with a circular Nelson loop for receiving radio signals at the first RF connector on the first side of the electronic radio module, wherein the first coaxial cable is in the shape of a circle with a central opening and, wherein the first coaxial cable is configured to send the received RF radio signals to the first PCB RF connector connected the first side of the PCB;

a second RF connector at the second side of the electronic radio module;

a second PCB RF connector connected on the second side of the PCB; and a second coaxial cable formed with a circular Nelson loop for receiving transmit radio signals at the second PCB RF connector on the second side of the PCB, wherein the second coaxial cable is in the shape of a circle with a central opening and wherein the second coaxial cable is configured to send the transmit radio signals to the second RF connector that at the of the housing.

15. The system for receiving and transmitting radio RF signals of claim 14 wherein the Nelson loop formed by the first coaxial cable has a diameter of about one inch and a circumference of about three inches, and wherein the first coaxial cable is formed as a circular loop.

16. The system for receiving and transmitting radio frequency (RE) signals of claim 14 wherein the coaxial cable further comprises:

a single central conductor, and wherein the coaxial cable is configured to operate at up to 6 GHz.

17. The system for receiving and transmitting radio frequency (RF) signals of claim 14 wherein the coaxial cable has a diameter of about 1.4 millimeters, the coaxial cable has a capacitance of about 23 pf/ft, the coaxial cable has a propagation delay of about 1.16 ns/ft and the coaxial cable has an impedance of about 50 ohms.

18. A method of processing an RF signal with an electronic module configured to operate within a Department of Defense's (DoD) Joint Tactical Radio System (JTRS) in altitudes up to 15000 feet, at operating temperatures between −40 to +55 degrees Celsius, at storage temperatures between −55 to +71 degrees Celsius, in driving rain and dust storms, in a corrosive salt-sea atmosphere and withstand indirect shock and further comprising:

receiving an RF signal at a connector on an exterior of an electronic module housing;

transmitting the RF signal through a coaxial cable to a connector on a PCB mounted with in the electronic module housing; wherein the coaxial cable is twisted into a circular Nelson loop, wherein the coaxial cable is looped 360 degrees so that the Nelson loop has a central opening; and processing the RF signals on the PCB to extract readable data from the RF signal.

* * * * *